(12) United States Patent
Mosinskis

(10) Patent No.: US 9,671,283 B1
(45) Date of Patent: *Jun. 6, 2017

(54) APPARATUS AND METHOD FOR MODULATING A LASER BEAM AND SENSING THE OPTICAL POWER THEREOF

(71) Applicant: Microsemi Storage Solutions (U.S.), Inc., Aliso Viejo, CA (US)

(72) Inventor: Paulius Mosinskis, Richlandtown, PA (US)

(73) Assignee: Microsemi Storage Solutions (U.S.), Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/830,963

(22) Filed: Aug. 20, 2015

Related U.S. Application Data

(63) Continuation of application No. 13/912,514, filed on Jun. 7, 2013, now Pat. No. 9,197,318.

(51) Int. Cl.
    *H04B 10/07* (2013.01)
    *G01J 1/42* (2006.01)
    *H01S 3/00* (2006.01)
    *H04B 10/079* (2013.01)
    *H04B 10/564* (2013.01)

(52) U.S. Cl.
    CPC .......... *G01J 1/4257* (2013.01); *H01S 3/0014* (2013.01); *H01S 3/0085* (2013.01); *H04B 10/0799* (2013.01); *H04B 10/564* (2013.01)

(58) Field of Classification Search
    None
    See application file for complete search history.

(56) References Cited

U.S. PATENT DOCUMENTS

| 5,706,117 A | * | 1/1998 | Imai ...................... G02F 1/0123 372/29.02 |
| 5,930,022 A | | 7/1999 | Okuma |
| 6,124,956 A | | 9/2000 | Severn |

(Continued)

FOREIGN PATENT DOCUMENTS

JP     11087855    *   3/1999  ............... H01S 3/18

OTHER PUBLICATIONS

U.S. Appl. No. 13/912,514, Notice of Allowance dated Jul. 31, 2015.

(Continued)

*Primary Examiner* — Li Liu
(74) *Attorney, Agent, or Firm* — Dennis R. Haszko

(57) ABSTRACT

A method and apparatus for modulating a beam from a laser with an electro-absorption modulator, and determining the optical power of the beam by measuring a back current produced by the electro-absorption modulator. The apparatus comprises an electro-absorption modulator and a back current detector. The electro-absorption modulator receives an electronic digital signal from an electro-absorption driver. The electro-absorption modulator modulates the beam of the laser according to the electronic digital signal. While modulating the beam, the electro-absorption modulator produces a back current. This back current is proportional to the optical power of the beam. The back current detector measures the back current to determine the optical power of the beam.

12 Claims, 5 Drawing Sheets

(56) References Cited

U.S. PATENT DOCUMENTS

| | | |
|---|---|---|
| 6,624,917 B1 | 9/2003 | Paschal et al. |
| 6,731,880 B2 | 5/2004 | Westbrook et al. |
| 6,862,379 B2 | 3/2005 | Howley |
| 6,873,801 B1 | 3/2005 | Yamaki et al. |
| 7,027,466 B1 | 4/2006 | Ozeki |
| 7,181,142 B1 | 2/2007 | Xu et al. |
| 7,570,845 B2 | 8/2009 | Welch et al. |
| 8,009,940 B2 | 8/2011 | Nagarajan et al. |
| 2004/0028099 A1 | 2/2004 | Hongo et al. |
| 2004/0102914 A1 | 5/2004 | More |
| 2005/0249508 A1 | 11/2005 | Volz et al. |
| 2006/0114777 A1 | 6/2006 | Watanabe et al. |
| 2006/0238267 A1 | 10/2006 | Bienek et al. |
| 2007/0116478 A1 | 5/2007 | Chen |
| 2007/0183790 A1* | 8/2007 | Matsumoto .......... H04B 10/564 398/182 |
| 2007/0291808 A1 | 12/2007 | Ledentsov et al. |
| 2008/0024160 A1 | 1/2008 | Ou-yang et al. |
| 2008/0088354 A1 | 4/2008 | Mosinskis |
| 2008/0094123 A1 | 4/2008 | Koh et al. |
| 2008/0218100 A1 | 9/2008 | Parikh |
| 2009/0310961 A1 | 12/2009 | Bowler et al. |
| 2009/0324255 A1 | 12/2009 | Nakamoto |
| 2010/0220952 A1 | 9/2010 | Smith et al. |
| 2011/0025422 A1 | 2/2011 | Marra et al. |
| 2011/0069956 A1 | 3/2011 | Biegert et al. |
| 2011/0206384 A1 | 8/2011 | Zhou et al. |
| 2012/0162743 A1 | 6/2012 | Okada |
| 2013/0070805 A1 | 3/2013 | Coln et al. |
| 2013/0084065 A1* | 4/2013 | Ishii .................... H04B 10/564 398/38 |
| 2013/0154677 A1 | 6/2013 | Sun et al. |

OTHER PUBLICATIONS

U.S. Appl. No. 14/827,451, Office Action dated Dec. 12, 2016.
U.S. Appl. No. 14/827,451, Office Action dated Dec. 29, 2016.

* cited by examiner

APPARATUS AND METHOD FOR MODULATING A LASER BEAM AND SENSING THE OPTICAL POWER THEREOF

CROSS REFERENCE TO RELATED APPLICATION

This application is a Continuation application of U.S. patent application Ser. No. 13/912,514, filed on Jun. 7, 2013, which is hereby incorporated by reference in its entirety in this application.

FIELD

The present disclosure relates generally to the field of optical communications. More particularly, the present disclosure relates to sensing the optical power of a laser beam in an optical communication system.

BACKGROUND

Electronic digital signal can be converted to optical digital signal for use in an optical communication network.

FIG. 1. shows an apparatus 100 for converting an electronic digital signal to an optical digital signal. The apparatus 100 uses a direct current laser 106 and an electro-absorption modulator 102 to transmit optical signals in an optical communication system 110. A steady laser beam is directed by the laser 106 onto the electro-absorption modulator 102. The electro-absorption modulator 102 modulates or permits less or more of the laser light to pass therethrough. The electro-absorption modulator 102 is controlled by a control signal, such as a digital electrical signal. When a high voltage difference is applied across the electro-absorption modulator 102, more light is absorbed by the modulator and less laser light is permitted to pass therethrough into the optical communication network 110. Conversely, when a low voltage difference is applied across the electro-absorption modulator 102, less light is absorbed by the modulator and more laser light is permitted to pass therethrough. By modulating the amount of laser light according to the control signal, the electro-absorption modulator 102 converts the electrical signal into an inverted optical signal.

In some implementations, it is important to know the optical power of the transmitting laser when transmitting an optical signal in an optical communication system 110. This is because the optical power measurement is used in a feedback loop to help keep the optical power output of the laser constant. Laser optical power output is liable to change due to voltage variations used to power the laser (bias), the laser's temperature, and the laser's hours of operation (age).

The optical power of the laser 106 is measured by either tapping and measuring a portion of laser energy from the back of the laser 106 using a back-facet monitor 150, tapping and measuring a portion of the laser energy from the front of the laser using a front-facet monitor 152, or by splitting a portion of the modulated laser light away from a transmit path into a sense detector using a power tap 154. Power tapping is performed by splitting a small part of the optical signal away from the main optical path and diverting into a photodetector 156. The photodetector 156 outputs an analog signal which is digitized by an analog-to-digital converter 158. For ease of reference, all three of these methods are shown together in the apparatus 100 shown in FIG. 1. For clarity, any one of these methods can be used alone or in conjunction to measure the optical power of the laser 106.

All three of the methods for measuring optical power involve taking a portion of the energy or light from the laser 106 by splitting the laser beam and using a photodetector 156 and an analog-to-digital converter 158 to measure the optical power of the laser beam. Since the laser beam is split, all three methods also result in a loss in the transmit optical power of the laser. To compensate for the loss of optical power, electrical power to the laser is increased. Greater electrical power, however, creates more heat which can further degrade the optical power of the laser. If significant heat is generated by the laser, then cooling may also be required.

Improvements in measuring the optical power of a laser during modulation are desirable. Namely, the improvements would reduce the amount of laser energy used to measure the optical power of the laser.

BRIEF DESCRIPTION OF THE DRAWINGS

Embodiments of the present disclosure will now be described, by way of example only, with reference to the attached Figures.

DETAILED DESCRIPTION

Figure 1:
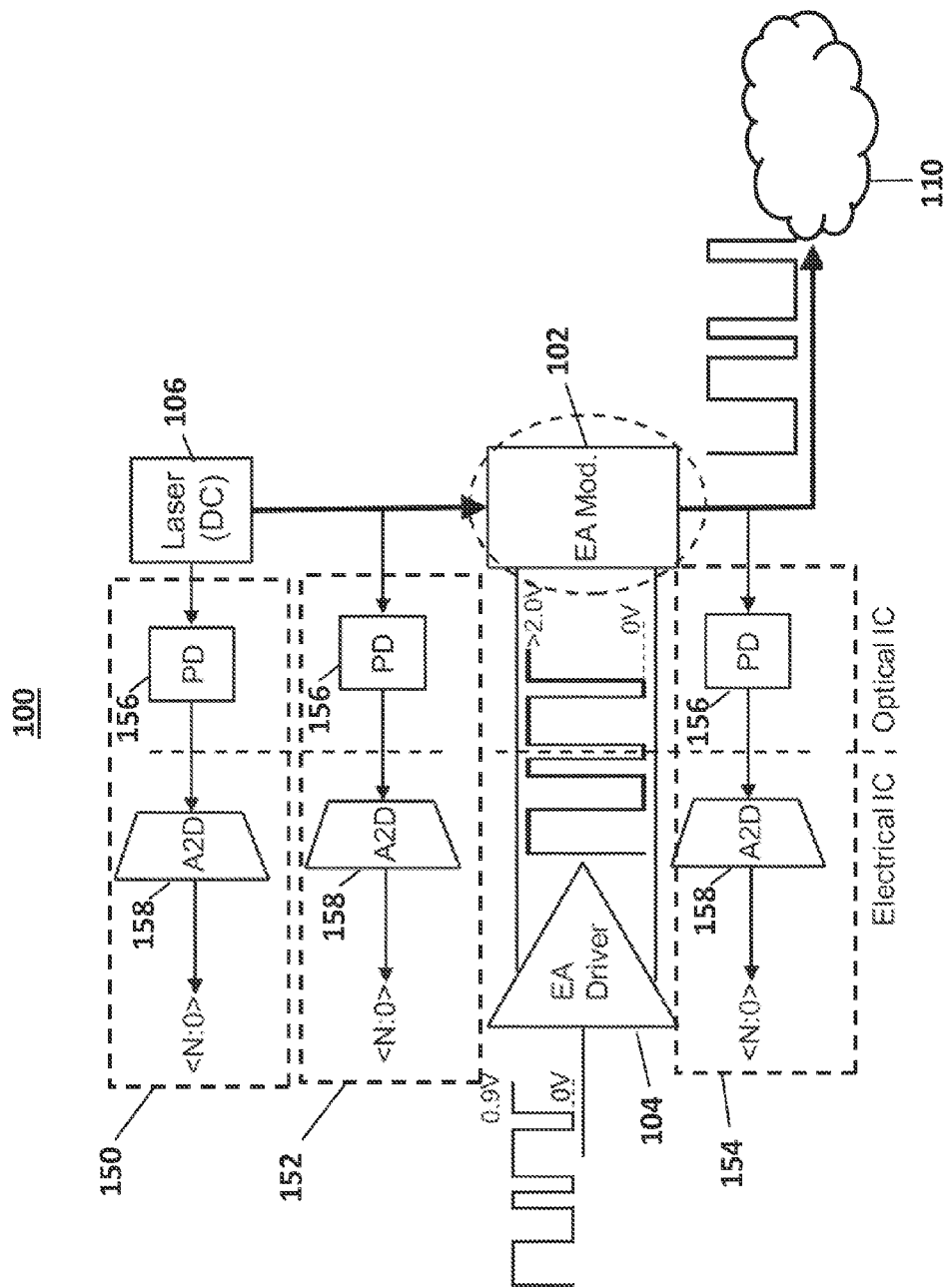
FIG. 1 shows an apparatus for converting an electronic digital signal to an optical digital signal and for measuring the optical power of a laser as known in the art.

A method and apparatus are provided for modulating a beam from a laser with an electro-absorption modulator, and determining the optical power of the beam by measuring a back current produced by the electro-absorption modulator. Using the electro-absorption modulator for determining optical power, instead of splitting the beam as in known approaches, helps avoid loss of optical power of the beam altogether. Methods are also provided for calibrating the apparatus.

The apparatus comprises an electro-absorption modulator for modulating the beam according to an electronic digital signal and generating a back current; and a back current detector in electrical communication with the electro-absorption modulator for measuring the back current generated by the electro-absorption modulator to determine the optical power of the beam. In an embodiment, the apparatus further comprising an electro-absorption driver electrically connected to the electro-absorption modulator for generating the electronic digital signal. In another embodiment, the back current detector measures the current flowing between the electro-absorption driver and the electro-absorption modulator. In another embodiment, the back current detector comprises a resistor electrically connected in series between the electro-absorption driver and the electro-absorption modulator; an analog difference amplifier electrically connected to the resistor for measuring a voltage difference across the resistor; two component groups, each component group attached to one side of the resistor and to the analog difference amplifier, each component group comprising a low-pass filter for filtering out the electronic digital signal; and a processor electrically connected to the analog difference amplifier for converting the measured voltage difference to an optical power using the value of the resistor and a transfer function. In another embodiment, the back current detector comprises a resistor electrically connected in series between the electro-absorption driver and the electro-absorption modulator; a comparator in electrical communication with the resistor for determining the digital voltage difference across the resistor; two component groups, each component group attached to one side of the resistor and to the analog difference amplifier, each component group comprising: an analog-to-digital converter for digitizing the voltage on the side of the resistor; and averagers electrically connected in series to the analog-to-digital converter for averaging the digitized voltage across the resistor over a period of time; and a processor electrically connected to the comparator for converting the measured voltage across the resistor into an optical power using the value of the resistor and a transfer function. In another embodiment, the low-pass filters electrically connected between the resistor and averagers for anti-aliasing the voltage difference across the resistor. In another embodiment, the back current detector is electrically connected to the electro-absorption driver to measure the back current from the electro-absorption modulator by determining the difference in current drawn by the driver from a high-voltage source and returned by the driver to a low-voltage source. In another embodiment, the back current detector comprises a first back current detector positioned between the high-voltage source and the electro-absorption driver for measuring the current drawn by the driver; a second back current detector positioned between the electro-absorption driver and the low-voltage source for determining the current returned by the electro-absorption driver; and a processor for subtracting the current drawn by the electro-absorption driver from the current returned by the electro-absorption driver and using a calculating the optical power by using a transfer function.

In another embodiment, the first and second back current detectors each comprise a resistor connected in series between the electro-absorption driver and the voltage source; an analog difference amplifier electrically connected to the resistor for measuring a voltage difference across the resistor; low pass filters electrically connected in series between the resistor and analog difference amplifier for filtering out the voltage difference caused by the electronic digital signal from the voltage difference caused by the back current; and an analog-to-digital converter for digitizing the voltage difference. In another embodiment, the apparatus comprises a precision current source between a voltage source and the electro-absorption driver.

The method for modulating a beam from a laser and determining an optical power of the beam during modulation comprises projecting the beam onto an electro-absorption modulator; modulating the beam with the electro-absorption modulator according to an electronic digital signal; generating a back current using the electro-absorption modulator; and measuring the back current to determine the optical power of the beam. In an embodiment, the measured back current is digitized. In another embodiment, a calibration offset is applied to the measured back current.

The method for calibrating a transfer function of an electro-absorption modulator comprises a. stimulating the electro-absorption modulator with a beam from a laser at a known optical power to create a back current; b. measuring the back current created by the electro-absorption modulator; c. storing the value of the back current and the value of the optical power in a memory; and d. repeating steps a to d with different optical powers until sufficient measurements have been taken to calibrate the transfer function in memory.

The method for calibrating an electro-absorption modulator for a resistor in a back current detector comprises pulling a precision current through the resistor; measuring a voltage difference across the resistor; calculating the difference between an ideal voltage difference across the resistor and the measured voltage difference across the resistor; and storing the difference in a memory to offset measurements of back current later performed by the back current detector.

Figure 2:
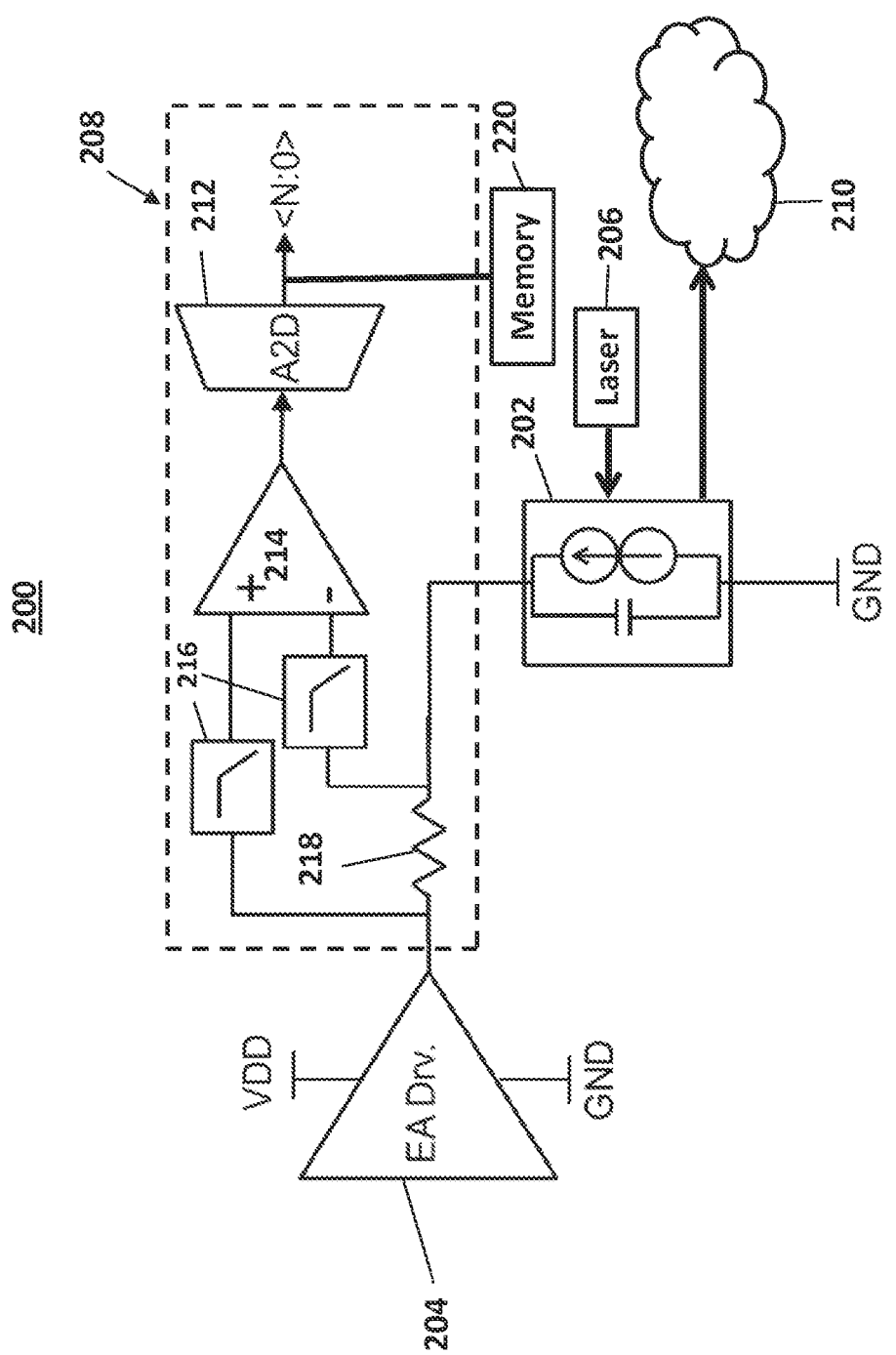
FIG. 2 shows an apparatus for converting an electronic digital signal to an optical digital signal while measuring the optical power of a laser in accordance with an embodiment of the present disclosure.

FIG. 2 shows an embodiment of an apparatus 200 for modulating a beam from a laser 206 while also determining the optical power of the beam. The apparatus comprises an electro-absorption modulator (modulator) 202, an electro-absorption driver (driver) 204, and a back current detector 208. The laser 206 is arranged to direct a constant laser beam onto the modulator 202. The driver 204 is electrically connected to the modulator 202 to provide a digital signal thereto. The digital signal consists of low and high voltages wherein the high voltage corresponds to VDD and the low voltage corresponds to GND. The voltages of the digital signal control the modulator 202. A high voltage causes the modulator 202 to absorb more of the laser beam thus limiting the amount of light passing therethrough into an optical communication network 210. A low voltage causes the modulator 202 to absorb less of the laser beam thus permitting more of the laser beam to pass therethrough into the optical communication network 210.

When the modulator 202 absorbs a portion of a laser beam, it produces a back current. The current flows from the modulator 202 to the driver 204. The back current is proportional to the optical power of the laser beam and the voltage across the modulator 202 as provided by the driver 204. Since the driver 204 never fully turns the modulator 202 off, a portion of the laser beam is always being absorbed by the modulator 202. Accordingly, the modulator 202 always produces a back current when a laser beam is directed thereon.

Connected between the driver 204 and the modulator 202 is the back current detector 208. The back current detector 208 is for measuring the back current produced by the modulator 202. The detected back current is used to determine the optical power of the laser.

In the example embodiment of FIG. 2, the back current detector 208 comprises an analog-to-digital converter 212, an analog difference amplifier 214, two low pass filters 216, and a resistor 218. The resistor 218 is inserted between the driver 204 and the modulator 202. Inputs of the analog difference amplifier 214 are each connected to one side of the resistor 218, and each of the low-pass filters 216 is connected in series with the analog difference amplifier 214. The voltages on both sides of the resistor 218 are filtered by the low-pass filters 216 to remove the high frequency voltage modulation caused by the digital signal from the driver 204. This results in average voltages being provided to the analog difference amplifier 214. The difference in average voltages between the sides of the resistor 218 is measured by the analog difference amplifier 214 and provided to the analog-to-digital converter 212 for digitization. The modulator 202 acts as a capacitor and does not permit direct current to flow from the driver 204 to GND. Notwithstanding, there is an alternating current component (caused by the driver 204) and therefore the low-pass filters 216 are required to filter out that alternating current.

In example embodiments, the back current detector 208 comprises any device that can measure the back current created by the modulator 202, and distinguish it from the current from the driver 204. In another example embodiment, the back current detector 208 comprises an ammeter.

The average voltage across the resistor 218 of the back current detector 208 is proportional to the current passing through the resistor 218 in accordance with the equation V=IR where V is the voltage difference across the resistor 218, I is the current passing through the resistor 218, and R is the size of the resistor 218 measured in ohms. Accordingly, the voltage difference measured by the analog difference amplifier 214 is proportional to the back current from the modulator 202 which, in turn, is proportional to the optical power of the laser directed on the modulator 202.

The correlation between optical power of a particular laser and the back current is expressed by an optical power to current transfer function (transfer function). Each modulator has its own unique transfer function. Accordingly, modulators need to be calibrated as further described below in relation to FIG. 5. The transfer function resulting from the calibration is stored in a memory 220. The transfer function can, for example, be stored as a look-up table.

To obtain the optical power, the digitized voltage difference is divided by the value of the resistor 218 and compared to the transfer function stored in memory 220. This calculation can be performed by using, for example, a processor. The processor can be a computer, or hard-coded logic for calculating the optical power.

Figure 3:
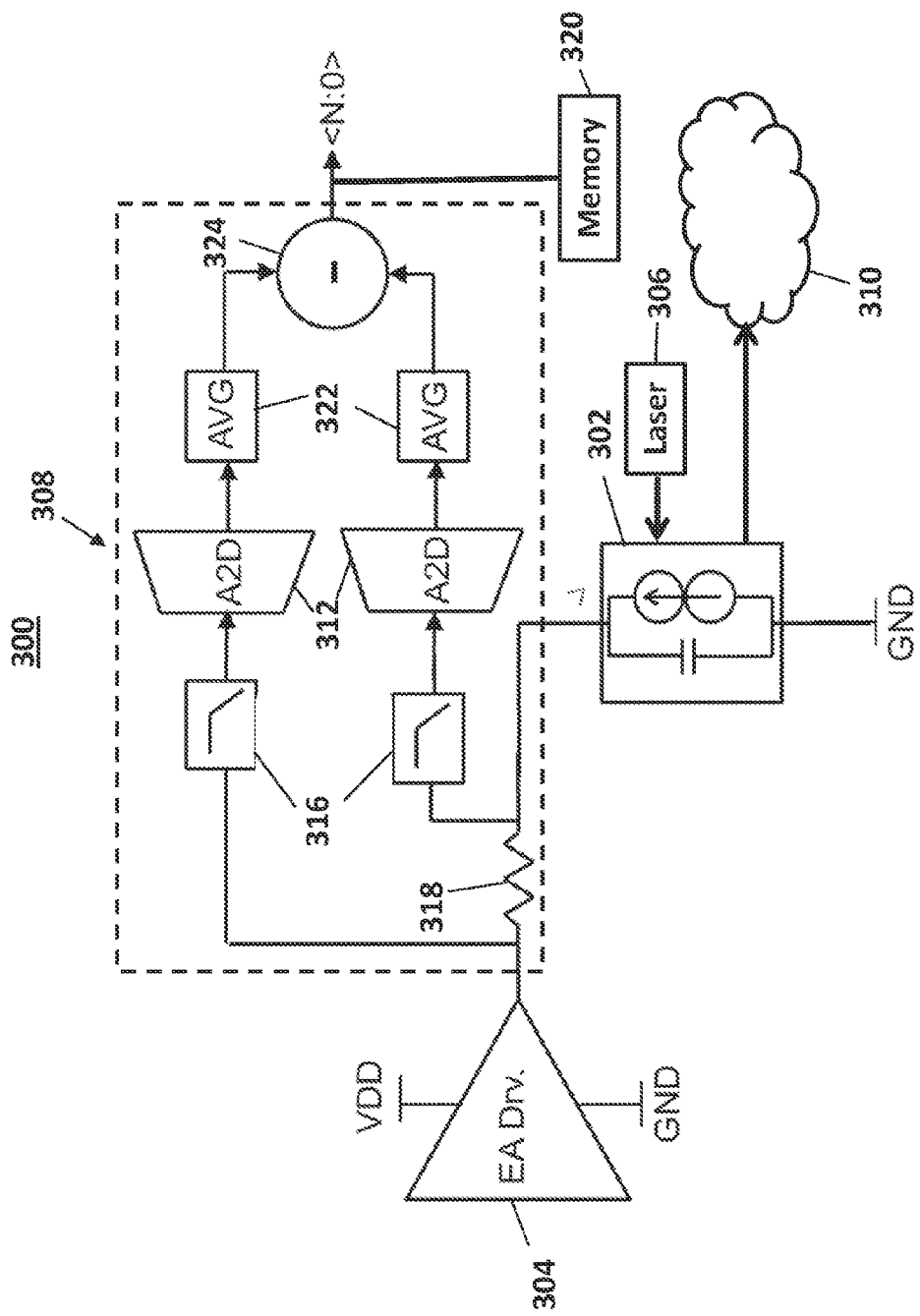
FIG. 3 shows an apparatus for converting an electronic digital signal to an optical digital signal while measuring the optical power of a laser in accordance with another embodiment of the present disclosure.

FIG. 3 shows another embodiment of an apparatus 300 for measuring the optical power of a laser 306. The apparatus 300 is similar to the apparatus 200 shown in FIG. 2, the difference being that the back current detector 308 takes the average of the voltage difference across a resistor 318 in the digital domain rather than the analog domain. The back current detector 308 comprises two component groups, each component group comprising a low-pass filter 316 connected in series with an analog-to-digital converter 312 an averager 322. Each component group is attached to one side of the resistor 318. The outputs of the averagers 322 are compared in a comparator 324 which generates a digital signal consisting of the average voltage across the resistor 318. The average voltage across the resistor 318 is then used, in combination with a transfer function and the value of the resistor 318, to calculate the optical power of the laser 306. Specifically, to obtain the optical power, the average voltage is divided by the value of the resistor 318 and compared to a transfer function stored in memory 320. The calculation can be performed by, for example, a processor. Alternatively, the logic for calculating the optical power can be implemented in an electronic circuit.

Because the averaging and comparison of the voltages on either side of the resistor 318 are performed in the digital domain, the low-pass filters 316 do not need to filter out the alternating current caused by the driver 304 and can simply be used to inhibit the aliasing of unwanted frequencies when converting from analog to digital. This reduces the size of the low-pass filters 316. In an example embodiment, the low-pass filters 316 can be eliminated if anti-alias filtering is performed in some other manner.

Figure 4:
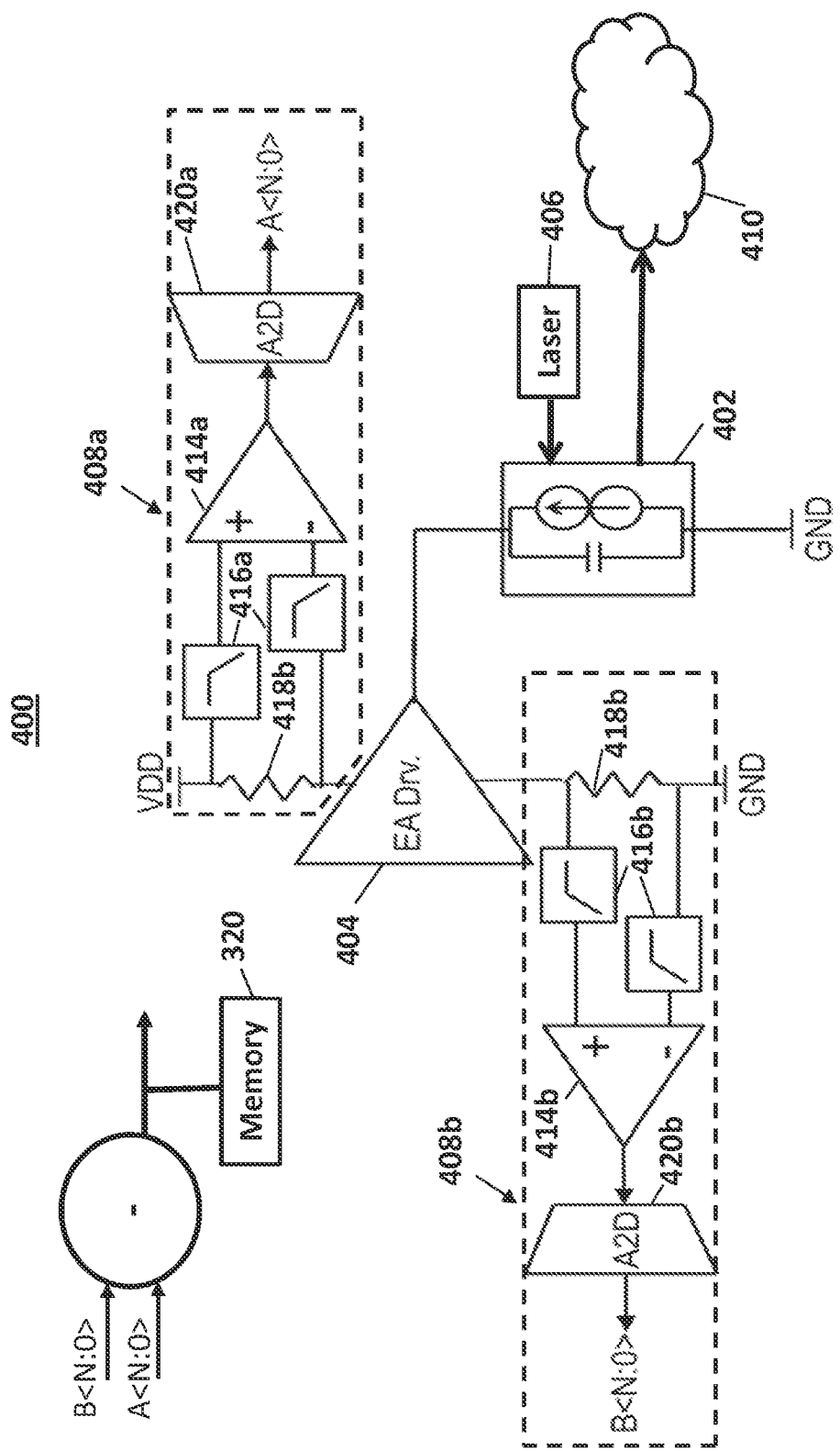
FIG. 4 shows an apparatus for converting an electronic digital signal to an optical digital signal while measuring the optical power of a laser in accordance with another embodiment of the present disclosure.

FIG. 4 shows another embodiment of an apparatus 400 for measuring the optical power of a laser 406. The apparatus 400 is similar to the apparatus 200 shown in FIG. 2, the difference being that a first back current detector 408a is used to sense the current drawn by a driver 404 from a high-voltage source VDD, and a second back current detector 408b is used to sense the current returned by the driver 404 to a low-voltage source GND. The difference between the two currents corresponds to a back current generated by a modulator 402 as a result of a beam from a laser 406 being directed thereon.

The back current detectors 408a, 408b are each essentially the same as the back current detector 208 as shown in FIG. 2. To obtain the optical power, the output of the analog-to-digital converters 420a, 420b are each divided by the value of the corresponding resistors 418a 418b, and the current drawn by the driver is subtracted from the current returned to GND. The result is the back current. The back current is then compared to a transfer function stored in a memory 420 to obtain the optical power of the laser beam. The calculation can be performed by, for example, a processor. Alternatively, the logic for calculating the optical power can be implemented in an electronic circuit.

The back current detector 408b may also be replaced with a known precision current source. This back current sensed by the back current detector 408a would then be subtracted from the current returning to ground. The current returning to ground would be known since it is determined by the precision current source.

Eliminating the back current detector between the driver 404 and the modulator 402 allows for a faster digital electronic signal to be communicated therebetween. This is because the combination of a resistor of a back current detector in series with a modulator (which acts like a capacitor), forms a low-pass filter which attenuates high frequency signals. In high speed optical communication networks, a faster signal from the driver 404 may be required.

Figure 5:
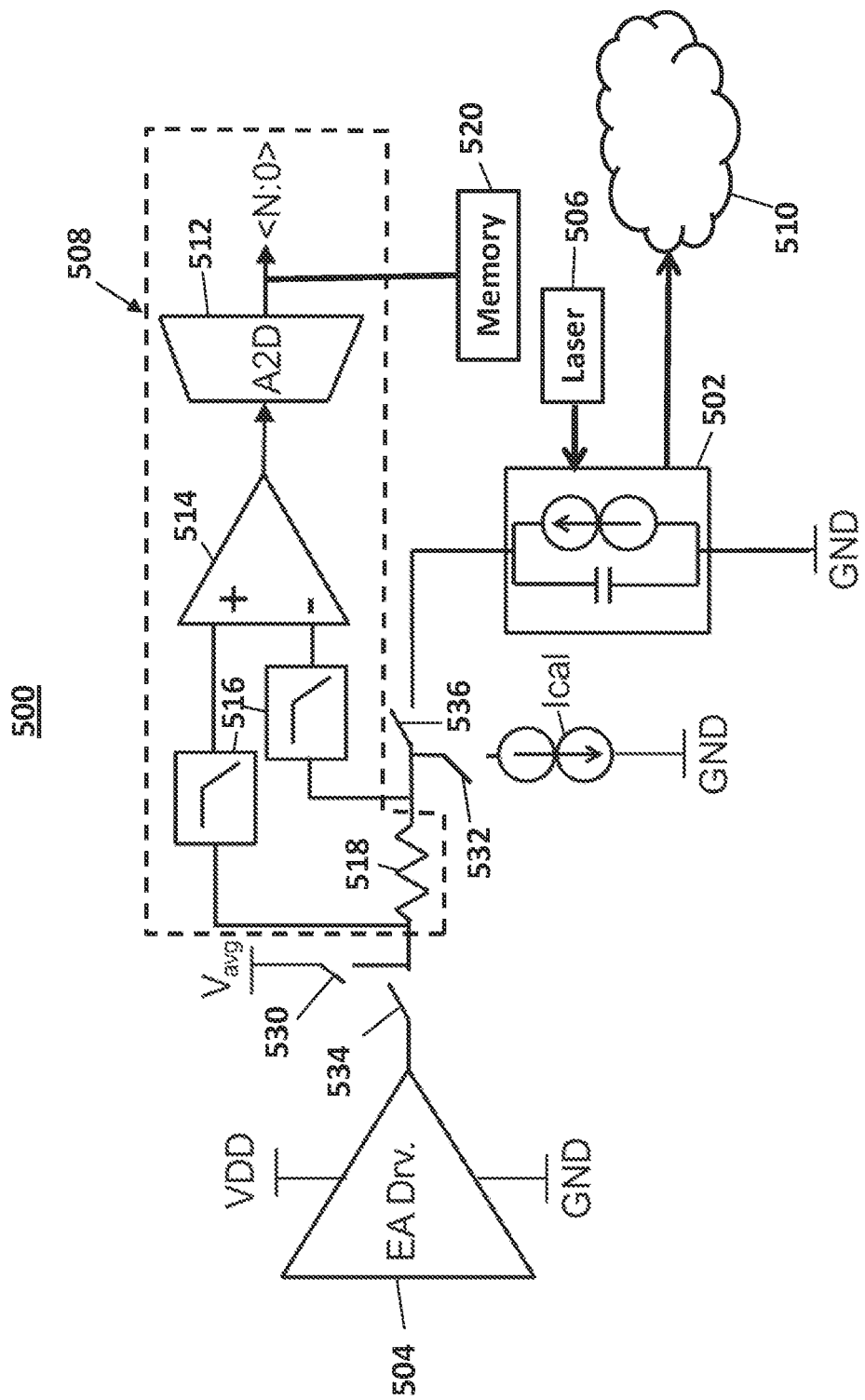
FIG. 5 shows an apparatus, similar to the apparatus of FIG. 2, for calibrating a transfer function.

FIG. 5 shows another embodiment of an apparatus 500 for measuring the optical power of a laser 506. The apparatus 500 is similar to the apparatus 200 shown in FIG. 2, the difference being that the apparatus 500 is additionally arranged to calibrate a transfer function.

To help improve the accuracy of the apparatuses 200, 300, and 400 for measuring the optical power of a laser, two types of calibrations can be performed. The first calibration accounts for variances between resistors of a back current detector 508 and determines an offset to be applied to measurements performed by the back current detector 508. The second calibration calculates the specific transfer function for a particular modulator. Without these calibrations, variations in the resistance used for establishing a voltage difference to sense the back current, or variations between modulators, could result in errors in determining the optical power of a laser.

The apparatus 500 comprises an average voltage source $V_{avg}$, connected between the driver 504 and the resistor 518. The average voltage source $V_{avg}$ is the average voltage the resistor 518 will experience during normal operation. The average voltage source $V_{avg}$ can be disconnected from the resistor 500 by a first switch 530.

The apparatus 500 also comprises a precision current $I_{cal}$ positioned after the back current detector 508 in parallel with the modulator 502. The precision current $I_{cal}$ is connected to ground GND and can be connected and disconnected from the apparatus 500 by switch 532.

The driver 504, and the modulator 502 can also each be disconnected from the back current detector 508 by their own respective switches 534, 536.

To calibrate the apparatus 500 to account for variances in a resistor 518 of the back current detector 508, both the driver 504 and the modulator 502 are disconnected from the apparatus 500 by opening their respective switches 534 and 536. The resistor 518 is then connected to the average voltage source $V_{avg}$ and the precision current $I_{cal}$ by closing their respective switches 530 and 532. Current is pulled through the resistor 518 by the precision current $I_{cal}$ and the voltage difference across the resistor 518 is measured using the back current detector 508. Since the precision current $I_{cal}$ is known, any voltage deviation from the result of multiplying the ideal resistance R of the resistor 518 by the precision current $I_{cal}$ is due to unintended effects, including, but not limited to, imperfections in the resistor 518, difference circuit offset, and analog-to-digital 512 offset. The voltage deviation detected as a result of calibration is retained in a memory 520. In future operation, when measuring back current, the value previously stored in memory 520 is used to offset the current being measured.

Instead of using a separate average voltage source $V_{avg}$, a driver 504 capable of producing an average voltage can be used. Likewise, if the optical power to current transfer function of the modulator 502 is known, then the precision current $I_{cal}$ is not required since the modulator 502 can create a precision current if driven with a laser with a known optical power.

The second type of calibration is performed when the transfer function of the modulator 202 is unknown. In this calibration, a laser 506 with a known precision optical power is used to stimulate the modulator 502. The precision current $I_{cal}$ is not used in this calibration. An average voltage is created by the driver 504 or the average voltage source $V_{avg}$ to cause the modulator 202 to absorb a certain portion of the laser's beam. The back current produced by the modulator 502 is then measured by the back current detector 508. The voltage difference (or current) that is measured by the back current detector 508 incorporates all of the apparatus' 500 imperfections including, but not limited to, imperfections in the resistor 518, difference circuit offset, and analog-to-digital 512 offset. Since the optical transfer function of a modulator 502 is non-linear, the above described calibration will likely need to be performed using multiple optical powers of the laser 506 over the intended range of operation. Since calibration of the transfer function also results in calibration of the resistor 518, resistor calibration is not required.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skilled in the art without departing from the scope, which is defined solely by the claims appended hereto.

What is claimed is:

1. An apparatus for determining an optical power of a laser beam during modulation, comprising:
    an electro-absorption driver;
    an electro-absorption modulator configured to modulate the laser beam according to a signal from the electro-absorption driver;
    a back current detector comprising a first current detector connected between a first voltage source and the electro-absorption driver to detect a first current flowing to the electro-absorption driver, and a second current detector connected between the electro-absorption driver and a second voltage source to detect a second current flowing from the electro-absorption driver, the first and the second voltage sources powering the electro-absorption driver, the back current detector configured to measure, based on the detected first and second currents, a back current generated by the electro-absorption modulator in response to modulating the laser beam;
    a memory storing a transfer function; and
    a processor in communication with the memory and the back current detector, the processor configured to determine the optical power of the laser beam based on the back current and using the transfer function.

2. The apparatus of claim 1, wherein the transfer function comprises a back current value correlated with an optical power value.

3. The apparatus of claim 2, wherein the back current value is a voltage value.

4. The apparatus of claim 1, wherein the processor is configured compare the back current to the transfer function to determine the optical power of the laser beam.

5. The apparatus of claim 1, wherein the transfer function is calibrated for the electro-absorption modulator.

6. The apparatus of claim 1, wherein the first voltage source is a high-voltage source, and the second voltage source is ground.

7. The apparatus of claim 1, wherein the first and second current detectors each comprise:
    a resistor connected in series between the electro-absorption driver and the voltage source;
    an analog difference amplifier electrically connected to the resistor for measuring a voltage difference across the resistor; and
    an analog-to-digital converter for digitizing the voltage difference.

8. The apparatus of claim 7, comprising a precision current source between the voltage source and the electro-absorption driver.

9. A method for determining an optical power of a laser beam during modulation, comprising:
- projecting the laser beam onto an electro-absorption modulator;
- generating a signal with a driver;
- modulating the laser beam with the electro-absorption modulator according to the signal;
- receiving a back current at the driver, the back current in response to the laser beam being projected onto the electro-absorption modulator; and
- measuring the back current responsive to a first current received by the electro-absorption driver from a high-voltage source, and a second current provided by the driver to a low-voltage source; and
- determining the optical power of the laser beam based on the back current and using a transfer function in a memory.

10. The method of claim 9, wherein measuring the first and second currents comprises measuring a voltage drop across a resistor, respectively.

11. The method of claim 9, wherein determining the optical power comprises comparing the back current to a value in the transfer function to identify the optical power.

12. The method of claim 9, wherein said measuring the back current comprises taking the difference between the first current and the second current.

* * * * *